Feb. 2, 1926. 1,571,647
A. V. SANTARSIERO
COMBINED HELICOPTER AND AEROPLANE
Filed Dec. 5, 1923   2 Sheets-Sheet 1
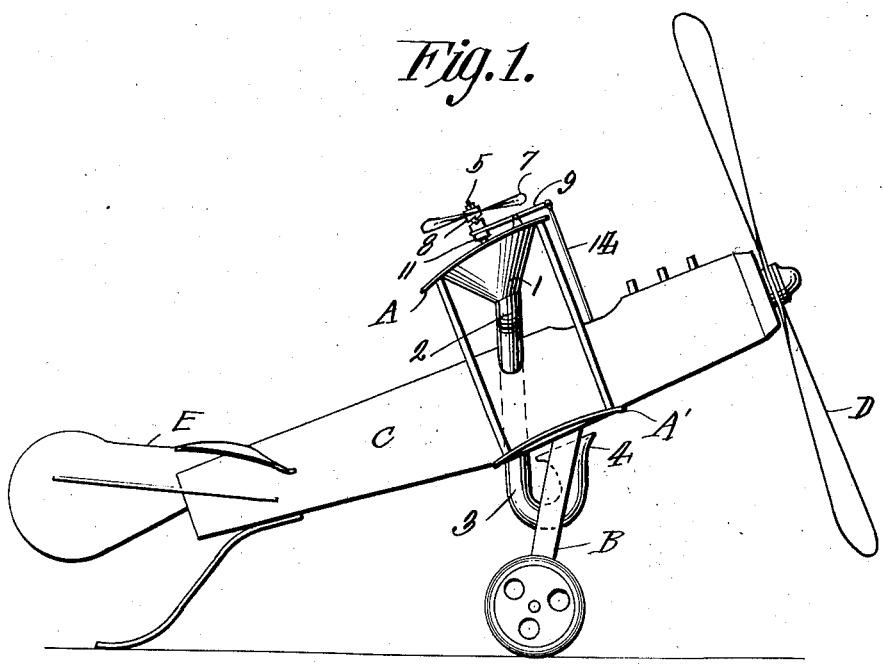
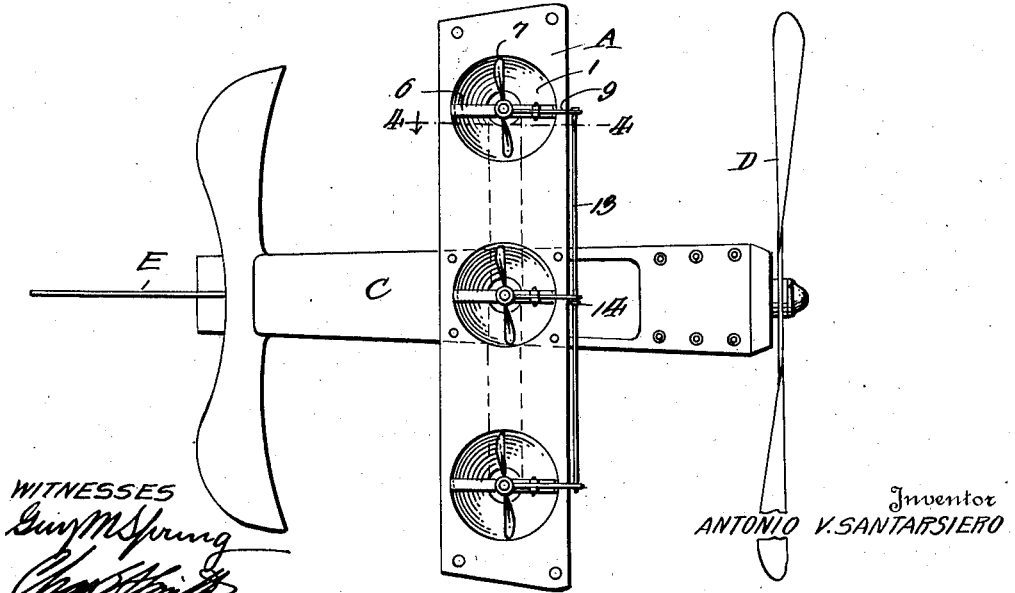
Inventor
ANTONIO V. SANTARSIERO Feb. 2, 1926. 1,571,647
A. V. SANTARSIERO
COMBINED HELICOPTER AND AEROPLANE
Filed Dec. 5, 1923   2 Sheets-Sheet 2
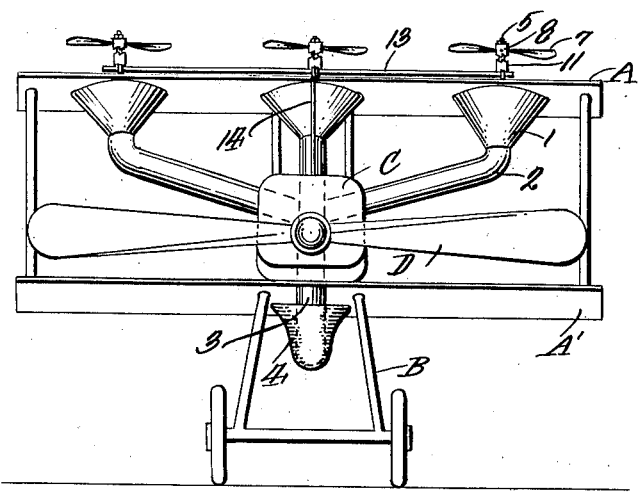
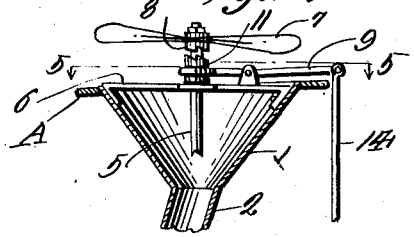
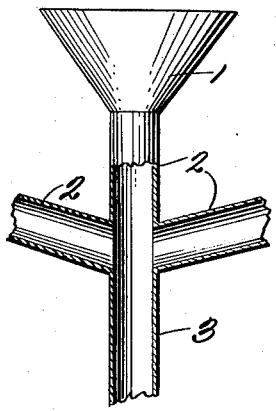
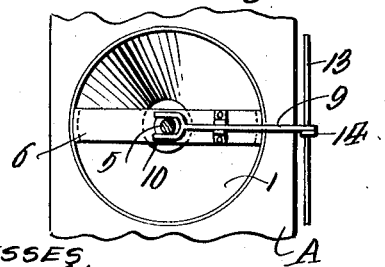
Inventor
ANTONIO V. SANTARSIERO Patented Feb. 2, 1926.

1,571,647

UNITED STATES PATENT OFFICE.

ANTONIO V. SANTARSIERO, OF NEW YORK, N. Y.

COMBINED HELICOPTER AND AEROPLANE.

Application filed December 5, 1923. Serial No. 678,759.

*To all whom it may concern:*

Be it known that I, ANTONIO V. SANTARSIERO, a citizen of the United States, residing at New York, in the county of New York and State of New York, have invented certain new and useful Improvements in a Combined Helicopter and Aeroplane, of which the following is a specification.

The present invention appertains to a combined helicopter and aeroplane having for its principal object to provide means for landing and launching air-vehicles, particularly aeroplanes of the monoplane or biplane type.

An important object of the invention is to provide means whereby an air-vehicle may be launched in a comparatively restricted area by being provided with means whereby it may be raised comparatively vertically, that is to say making it unnecessary for the vehicle to travel a long distance with a gradual ascent. The same advantages are gained in landing the vehicle, in that the device may be used to facilitate bringing the vehicle to earth in a comparatively small running space and without the danger of damaging the same.

Another very important object of the invention is to generally improve upon the helicopter features thereof by providing a mechanism which is simple and efficient in structure, reliable in operation, durable, and well adapted to the purpose for which it is designed.

With the above and numerous other objects in view as will appear as the description progresses, the invention resides in certain novel features of construction, and in the combination and arrangement of parts, as will be hereinafter more fully described and claimed.

Referring to the drawings which illustrate the preferred embodiment of the invention, the device is shown for the purpose of illustration, as applied to an air-vehicle of the biplane type.

In the drawings:

Figure 1 is a side elevation of a conventional type of biplane, as shown in the application of the present invention, Figure 2 is a top plan view thereof, Figure 3 is a front elevation thereof, Figure 4 is a detail section taken substantially on the line 4—4 of Figure 2.

Figure 5 is a detail section taken substantially on the line 5—5 of Figure 4, and Figure 6 is a detail section showing the air passage pipes as they connect together.

Referring to the drawings in detail it will be seen that A and A' represent the top and lower wings of the conventional type of biplane which are mounted on the fuselage C. This fuselage is mounted on a landing chassis indicated at B. A propeller D is mounted at the forward end of the fuselage and is driven by a suitable engine mounted therein. Any suitable conventional guiding apparatus E is preferably mounted on the rear of the fuselage. The parts thus far described are all of conventional construction except as may be hereinafter specified and, of course, may be varied without departing from the spirit or scope of the invention.

The top wing or plane A in the present instance is constructed with a plurality of depending funnel-shaped members 1 each of which communicates with a pipe 2. These pipes 2 lead toward the center of the fuselage C and communicate with a pipe 3. This pipe 3 extends downwardly through the fuselage and is then bent forwardly and upwardly terminating in a funnel-shaped outlet 4 immediately under the fuselage as is indicated to advantage in Figures 1 and 3, it being noted that the funnel also terminates immediately under the lower wing or plane A' when the device is used in conjunction with a biplane.

A drive shaft 5 is disposed in each funnel-shaped member 1 and may be driven in any suitable manner by the usual engine mounted in the fuselage C. Each funnel-shaped member 1 is provided with a bracket 6 through which the shaft 5 extends. The upper end of this shaft has mounted thereon a propeller 7 capable of independent rotation and provided with a clutch element 8. These propellers 7 preferably have their blades pitched at angles of approximately forty five degrees. A lever 9 is pivoted intermediate its ends on each bracket 6 and terminates in a forked end 10 straddling the shaft 5 and engaged with a clutch element 11 so that by swinging this lever this clutch element 11 may be engaged with the clutch element 8 on the adjacent propeller. The levers 9 are connected at their outer ends by a rod 13 which extends longitudinally with the forward edge of the upper wing A so that a connecting rod 14 may be attached thereto and extend down into the fuselage thus allowing the pilot of the aeroplane to control the clutches as may be desired.

When the connecting rod 14 is pulled downwardly thus causing the engagement of clutch elements 8 and 11 of the propellers 7 through the intermediacy of levers 9, it will be seen that these propellers will rotate having a tendency to lift the aeroplane from the ground. The air which is sucked downwardly by these propellers 7 will be forced into the funnel-shaped members 1, through pipes 2, through pipe 3, and exhausted through the funnel-shaped outlet 4 so as to impinge against the fuselage at its bottom thereby tending to raise the same. It will thus be seen that a greater efficiency is gained from the propellers and their full lifting force utilized.

In realizing the advantages of the construction contemplated by this invention, at the time of launching, the pilot will pull downwardly upon the rod 14 to connect the various clutch elements 8 and 11 so as to start rotation of the propellers 7, whereupon the machine is enabled to raise without the customary climb and of course when it has reached the desired height the driving propeller D may be started in the usual well known manner. In landing, the device may again be brought into operation as just explained and when in operation the driving propeller D may be stopped and by decreasing the speed gradually of the propellers 7, it will be seen that the aeroplane may be brought to the ground in a comparatively restricted space.

While the preferred embodiment of my invention has been described in detail, it will be understood that I do not wish to be limited to the particular construction set forth, since various changes in the form, proportions, and arrangement of parts, and in the details of construction may be resorted to without departing from the spirit and scope of the invention, or destroying any of the advantages contained in the same.

Having thus described my invention what I claim as new is:

1. In an aeroplane of the class described, a fuselage, a wing on the fuselage, a helicopter mechanism associated with the aeroplane including a propeller mounted on the wing, and means for downwardly conveying the current of air set up by said propeller and delivering it upwardly against the bottom of the fuselage.

2. In an aeroplane of the class described, a fuselage, a wing on the fuselage, a pipe leading from the wing below the fuselage and curved upwardly so as to terminate in close proximity to the bottom of the fuselage, and a propeller disposed to rotate adjacent the upper end of the pipe, all in the manner and for the purpose specified.

3. In an aeroplane of the class described, a fuselage, a wing on the fuselage, a funnel-shaped member depending from the wing, a pipe communicating with the bottom of the funnel-shaped member and passing through the fuselage and then curved upwardly so as to terminate adjacent the bottom of said fuselage, and a propeller rotatably mounted above the wing and above the funnel-shaped member so that when the same is rotated a current of air will pass through the funnel-shaped member, through the pipe and be impinged against the bottom of the fuselage.

4. In an aeroplane of the class described, a fuselage, a wing mounted on the fuselage, a plurality of funnel-shaped members depending from the wing, pipes depending from the funnel-shaped members and communicating therewith, another pipe passing through the fuselage and communicating with the other pipes, said last mentioned pipe being curved upwardly under the fuselage so as to terminate adjacent its bottom, a plurality of propellers one disposed above each funnel-shaped member, and a clutch mechanism associated with each propeller.

5. In an aeroplane of the class described, a fuselage, a wing mounted on the fuselage, a plurality of funnel-shaped members depending from the wing, pipes depending from the funnel-shaped members and communicating therewith, another pipe passing through the fuselage and communicating with the other pipe, said last mentioned pipe being curved upwardly under the fuselage so as to terminate adjacent its bottom, a plurality of propellers one disposed above each funnel-shaped member, a clutch mechanism associated with each propeller, and a common control mechanism for the clutch mechanism.

6. In an aeroplane, a fuselage, a wing on the fuselage, a funnel-shaped member depending from the wing, a pipe communicating with said funnel-shaped member and curved upwardly at its bottom end so as to terminate under the fuselage, and a propeller disposed to rotate above the funnel-shaped member so that a current of air set up by the propeller will pass through the funnel-shaped member, through the pipe and impinge against the bottom of the fuselage.

7. In an aeroplane of the class described, a fuselage, a propeller disposed to rotate in a substantially horizontal plane above the fuselage for thereby tending to lift the same vertically from the ground, and means for receiving the current of air set up upon rotation of said propeller so as to convey the same downwardly and then direct the same upwardly beneath the bottom of the fuselage.

8. In an aeroplane of the class described, a fuselage, a wing mounted on the fuselage, a funnel-shaped member depending from the wing, a pipe communicating with the funnel-shaped member and curved so as to terminate immediately below the fuselage, a bracket across the funnel-shaped member, a shaft journalled through said bracket, a propeller mounted on the shaft so as to rotate independently thereof and including a clutch element, a lever pivoted on the bracket, a second clutch element slidable on the shaft and controllable by the lever, said second element being rotatable with the shaft, and means for operating the lever from the fuselage.

9. In an aeroplane of the class described, a fuselage, an upper wing, a lower wing, a propeller disposed to rotate in a substantially horizontal plane above the upper wing, and means to downwardly convey the current of air set up by the rotation of said propeller and then discharge the same upwardly against the lower wing.

10. In an aeroplane of the class described, a fuselage, a wing mounted on the fuselage, a plurality of funnel-shaped members depending from the wing, a pipe passing through the fuselage and curved upwardly so as to terminate adjacent its bottom other pipes communicating the first mentioned pipe with the funnel-shaped members, a shaft in each funnel-shaped member, a propeller mounted on said shaft so as to rotate independently thereof, a clutch mechanism associated with each propeller and each shaft, and means whereby said clutch mechanisms may be operated in unison from the fuselage.

In testimony whereof I affix my signature.

ANTONIO V. SANTARSIERO.